R. A. LANCEY.
COUNTER MOLDING MACHINE.
APPLICATION FILED AUG. 26, 1914.
1,138,123.
Patented May 4, 1915.
12 SHEETS—SHEET 5.
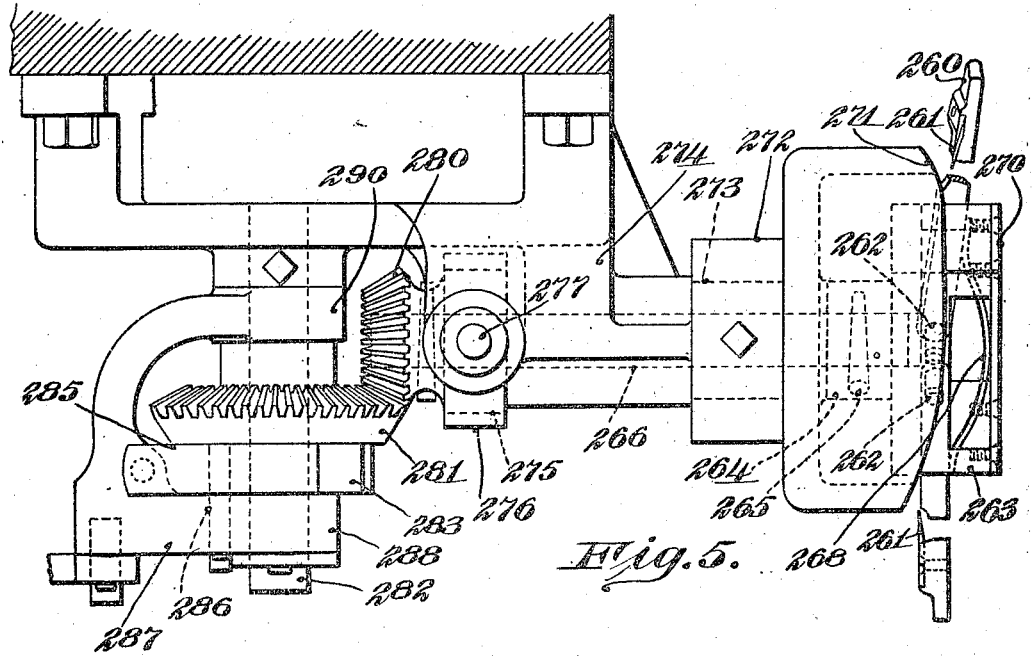
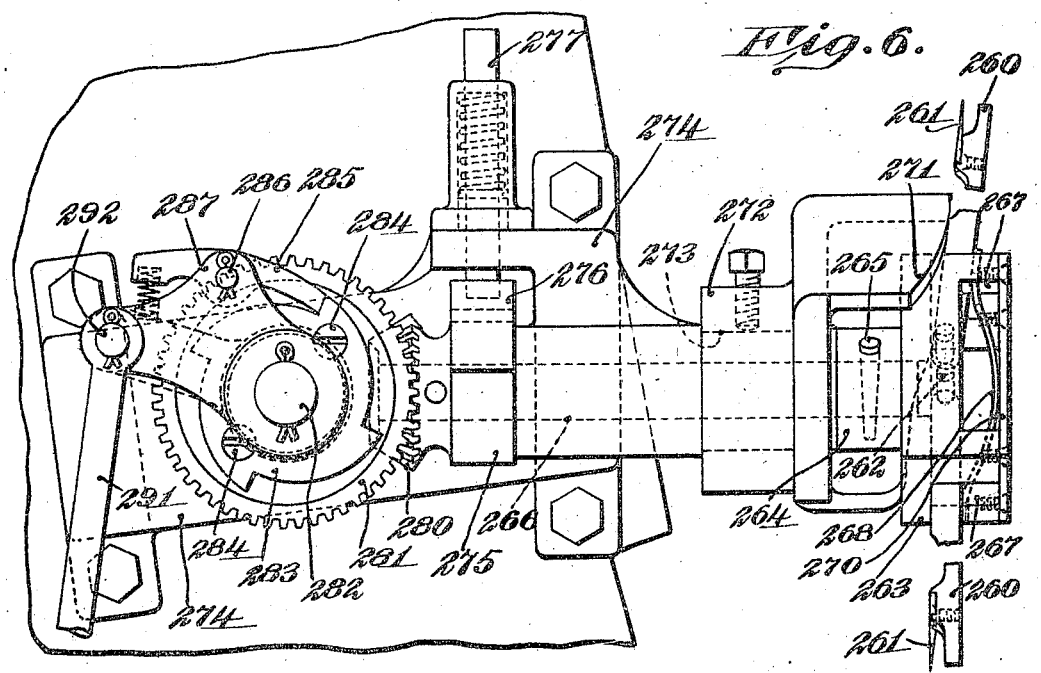

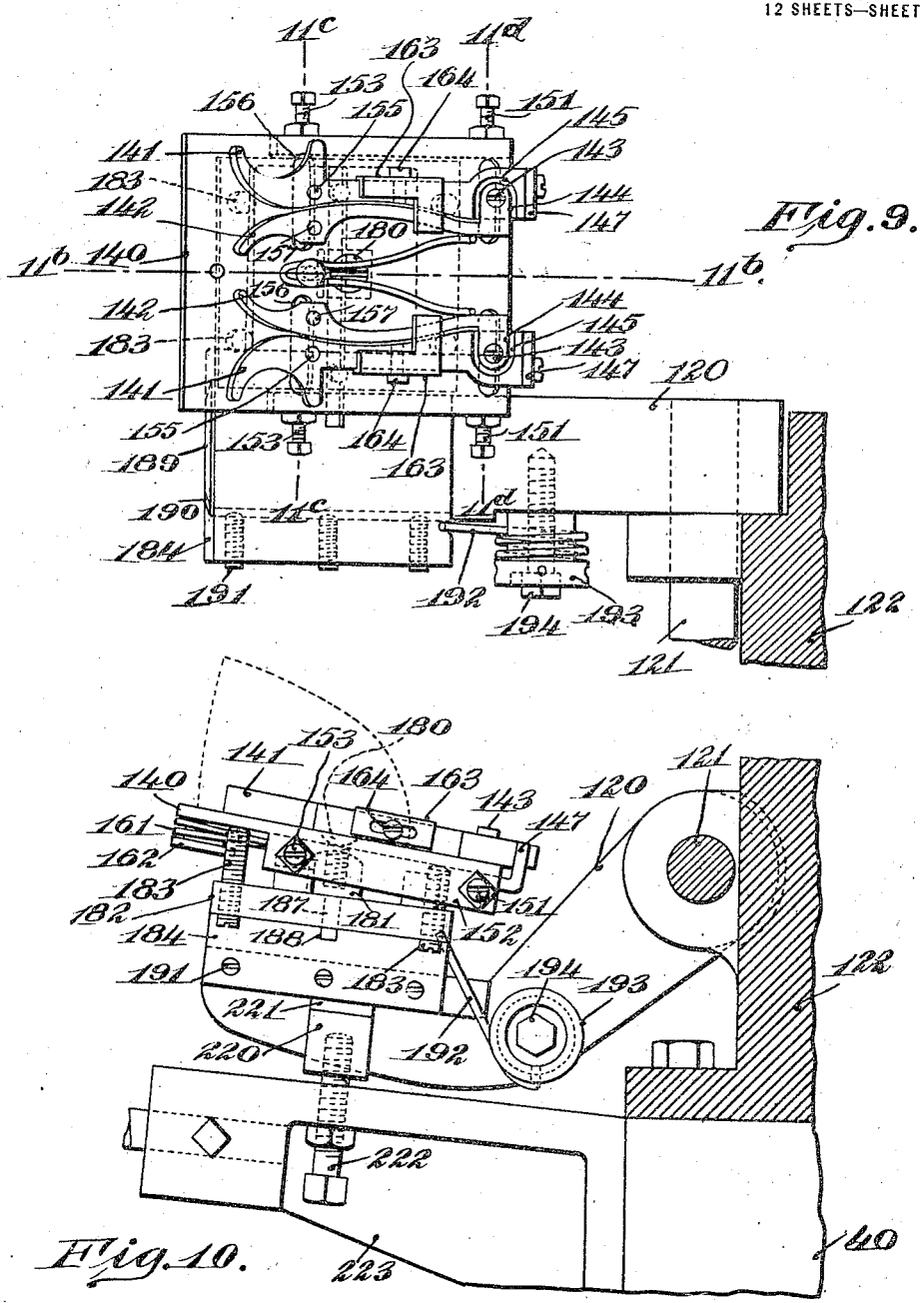

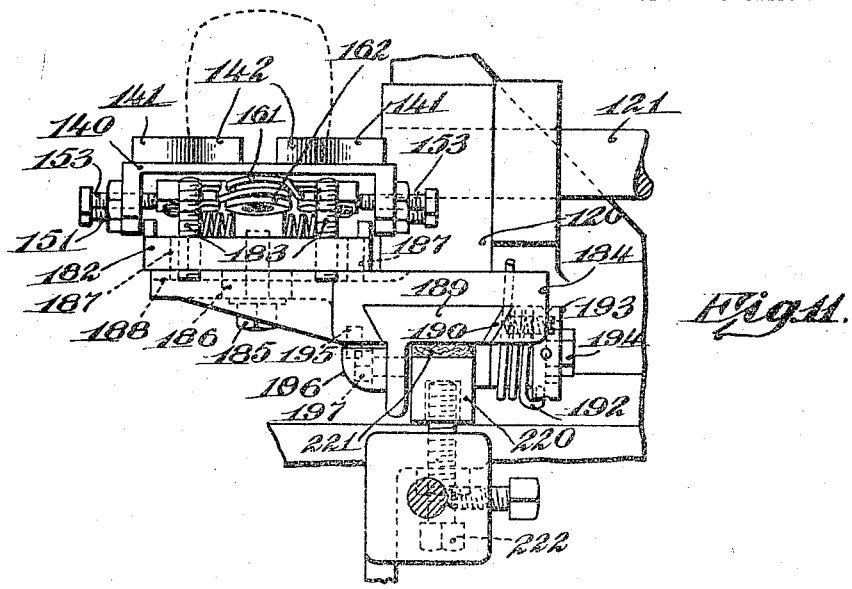

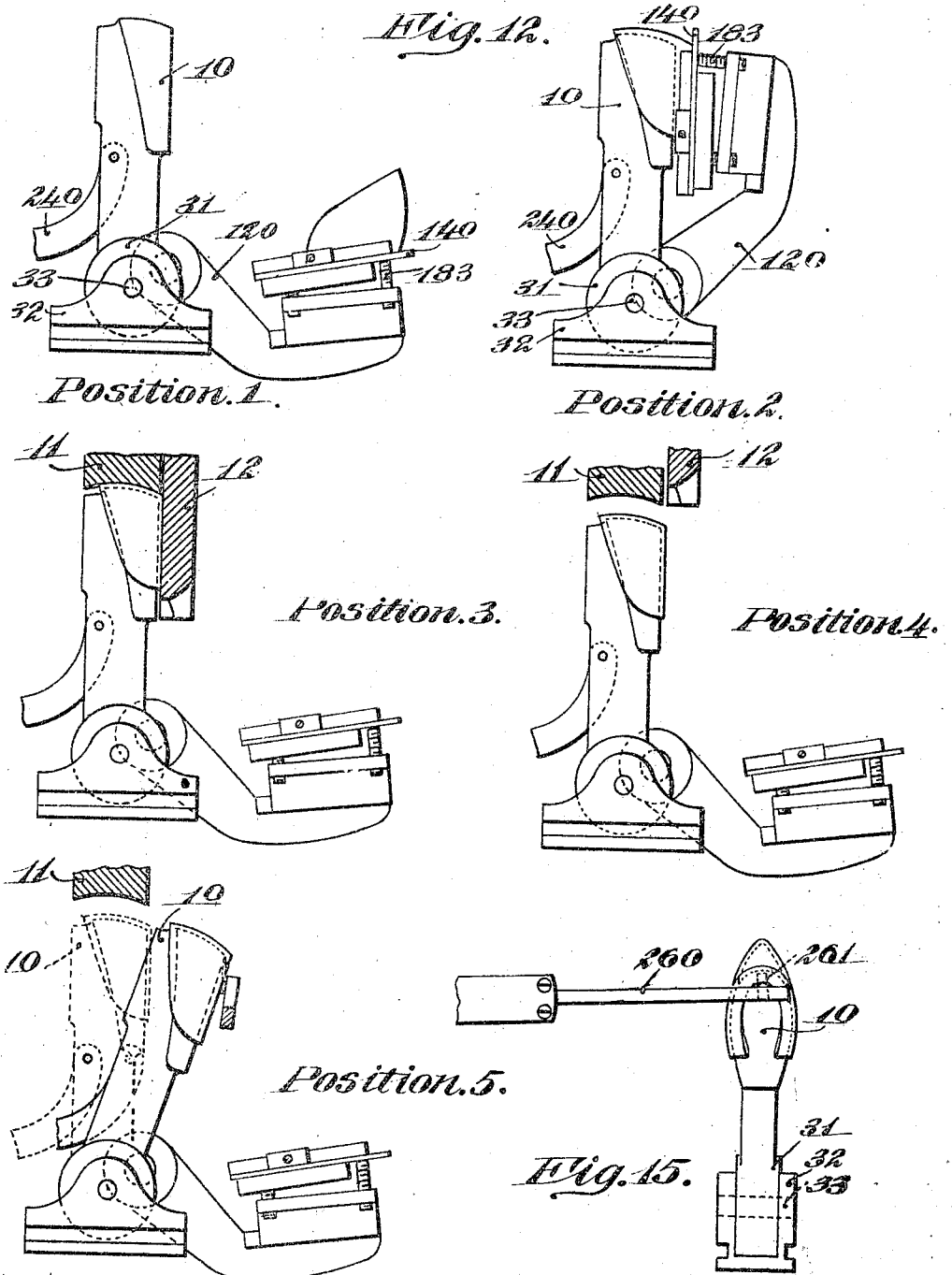

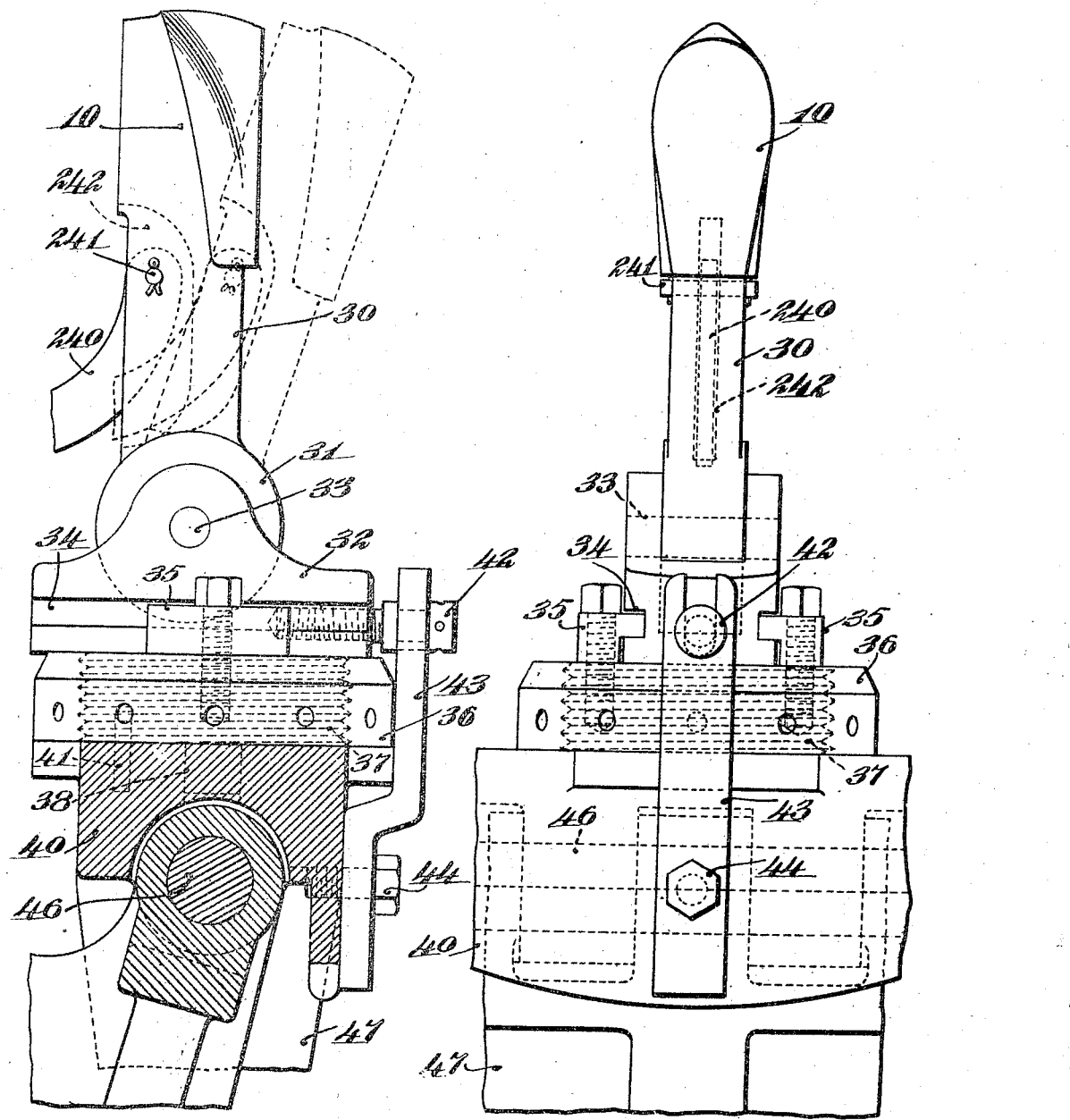

R. A. LANCEY.
COUNTER MOLDING MACHINE.
APPLICATION FILED AUG. 26, 1914.
1,138,123.
Patented May 4, 1915.
12 SHEETS—SHEET 11.
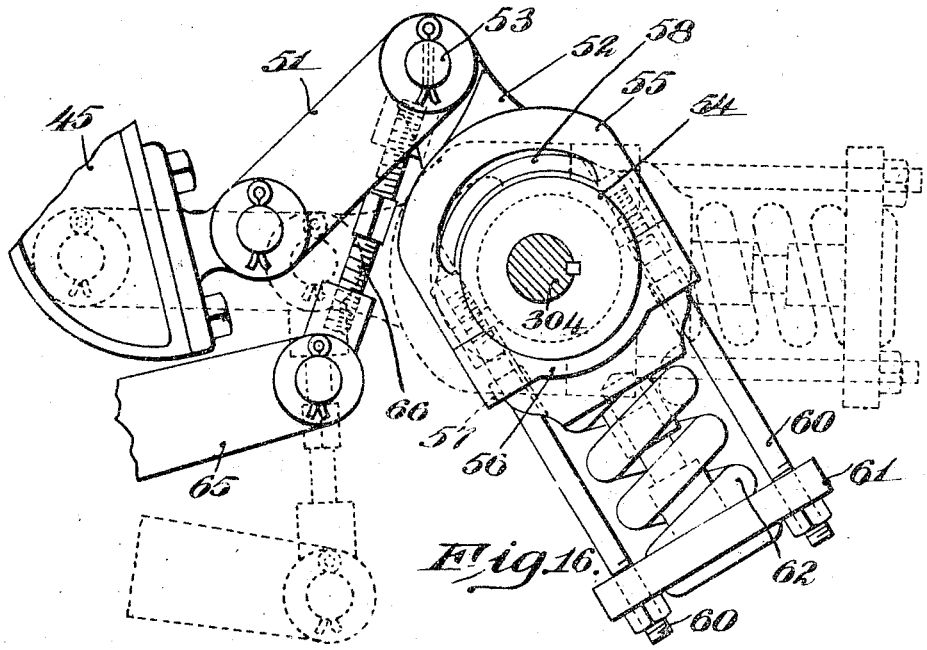
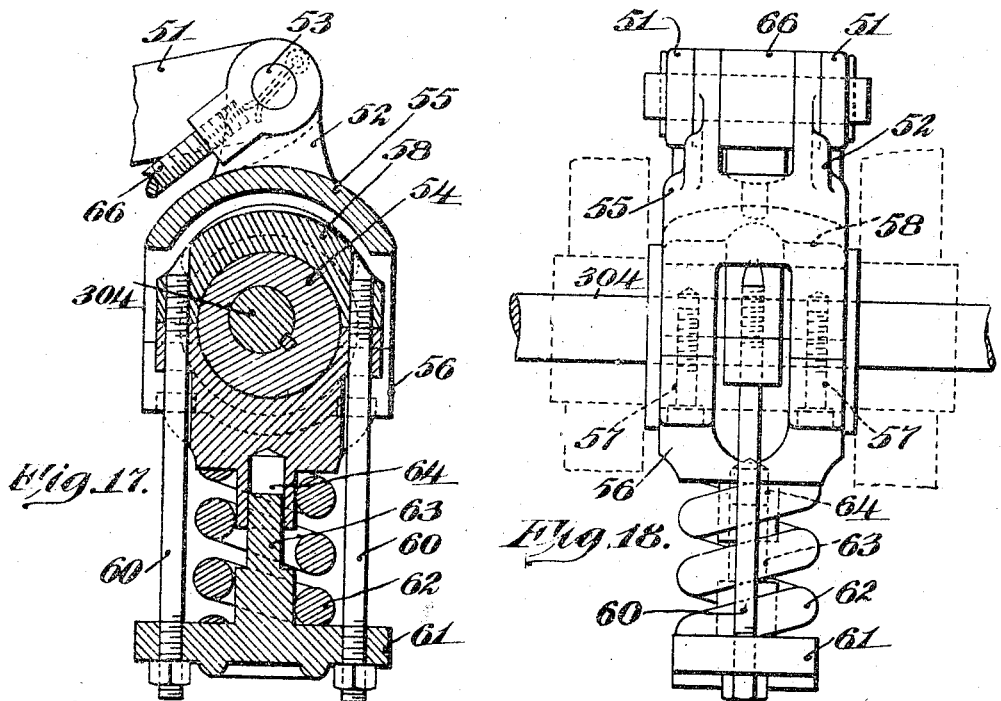

R. A. LANCEY.
COUNTER MOLDING MACHINE.
APPLICATION FILED AUG. 26, 1914.

1,138,123.

Patented May 4, 1915
12 SHEETS—SHEET 12.

Witnesses
Edward S. Doug
Alice Ackroyd

Inventor
Roswell A. Lancey,
by his Attorneys
Philipo Van Owen Fish

UNITED STATES PATENT OFFICE.

ROSWELL A. LANCEY, OF TOWNSEND, MASSACHUSETTS, ASSIGNOR TO LEON C. SPAULDING, HUNTLEY N. SPAULDING, AND ROLAND H. SPAULDING, OF ROCHESTER, NEW HAMPSHIRE, AND EMMA C. SPAULDING AND MARION L. SPAULDING, OF BOSTON, MASSACHUSETTS, COPARTNERS, DOING BUSINESS UNDER THE FIRM-NAME OF J. SPAULDING & SONS COMPANY, OF ROCHESTER, NEW HAMPSHIRE.

COUNTER-MOLDING MACHINE.

1,138,123.     Specification of Letters Patent.     Patented May 4, 1915.

Application filed August 26, 1914. Serial No. 858,748.

*To all whom it may concern:*

Be it known that I, ROSWELL A. LANCEY, a citizen of the United States, residing at Townsend, in the county of Middlesex and State of Massachusetts, have invented certain new and useful Improvements in Counter-Molding Machines; and I do hereby declare the following to be a full, clear, and exact description of the invention, such as will enable others skilled in the art to which it appertains to make and use the same.

The present invention relates to an improvement in counter molding machines. The object of the invention is to reorganize and improve counter molding machines and to produce a new and more efficient machine for molding counters.

To the above ends the invention consists in the counter molding machine hereinafter described and particularly defined in the claims.

Figure 1:
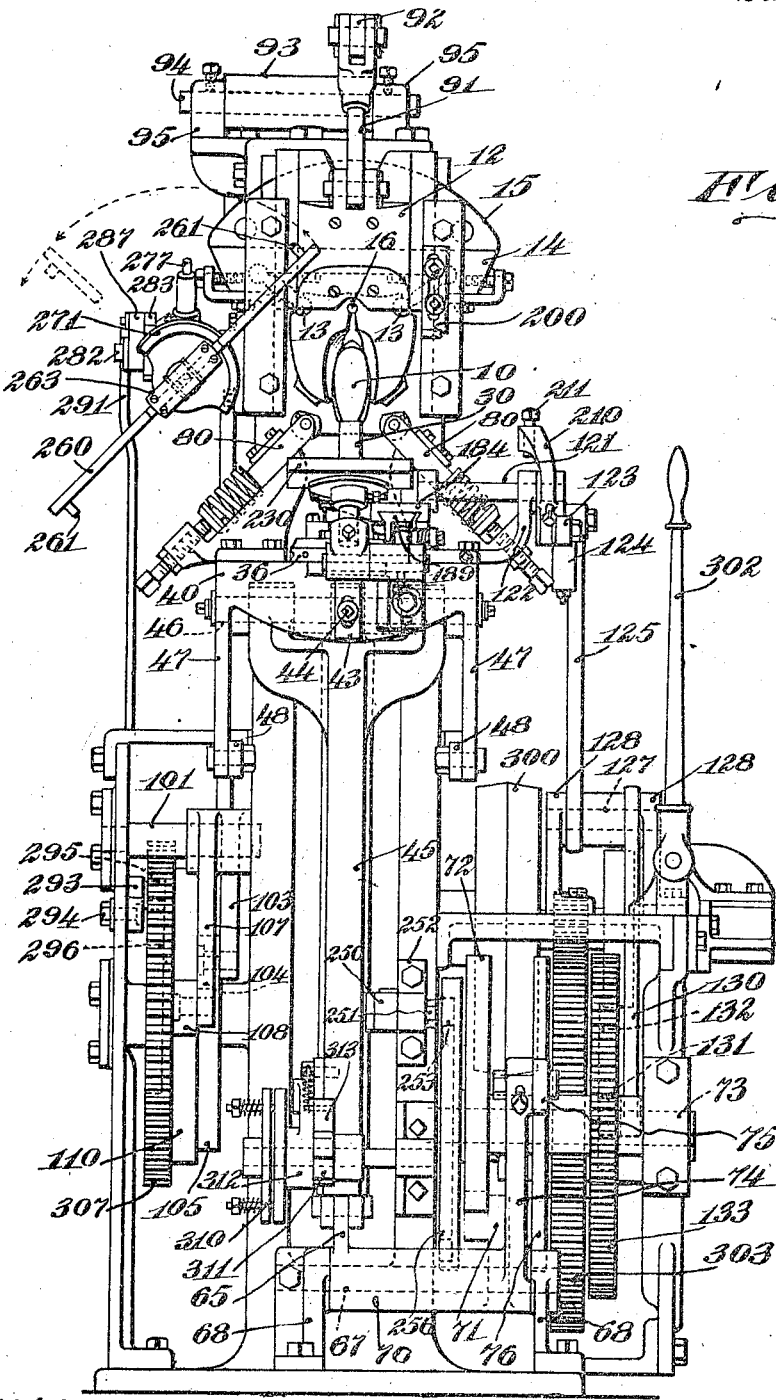
Figure 2:
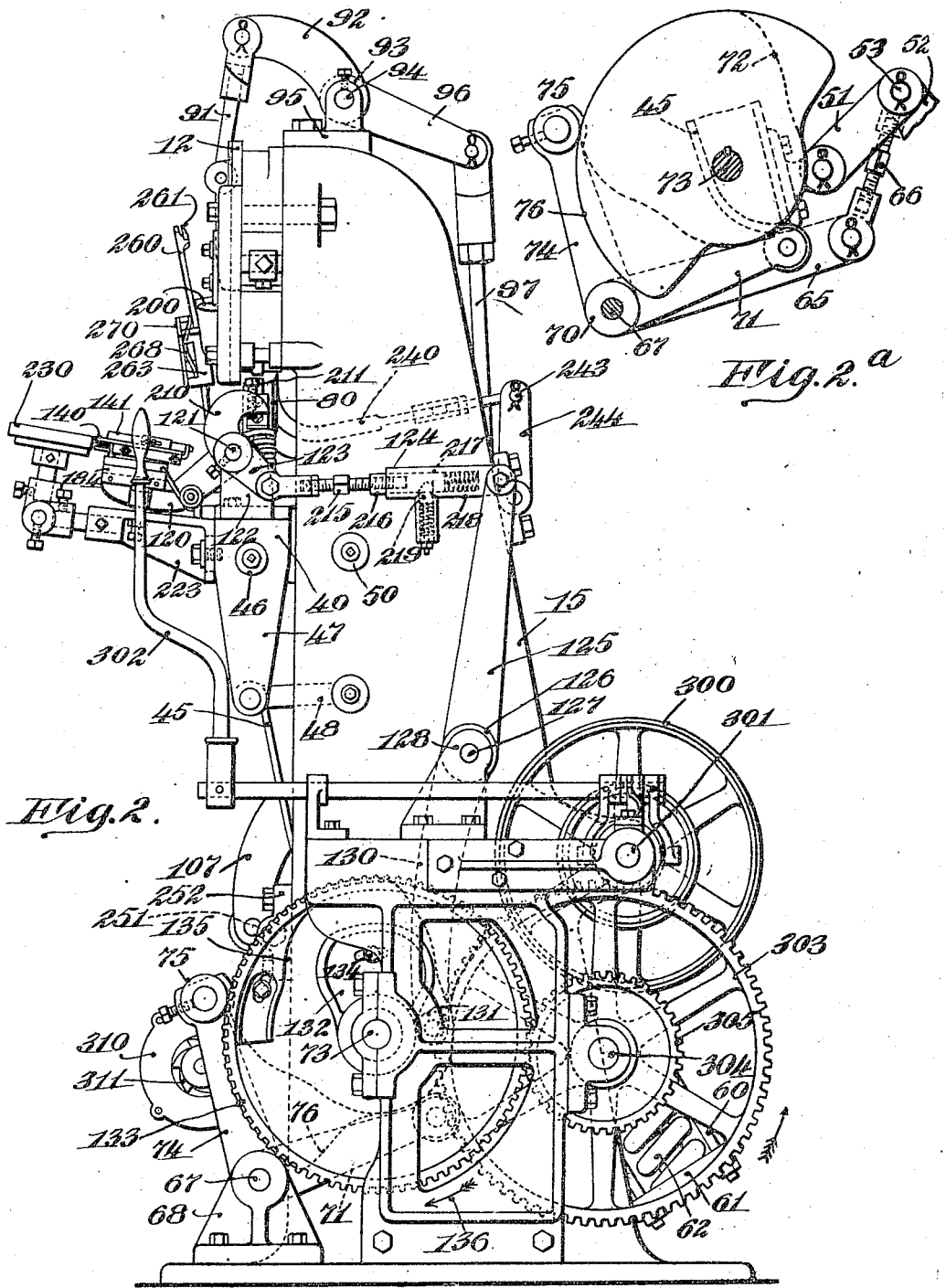
Figure 3:
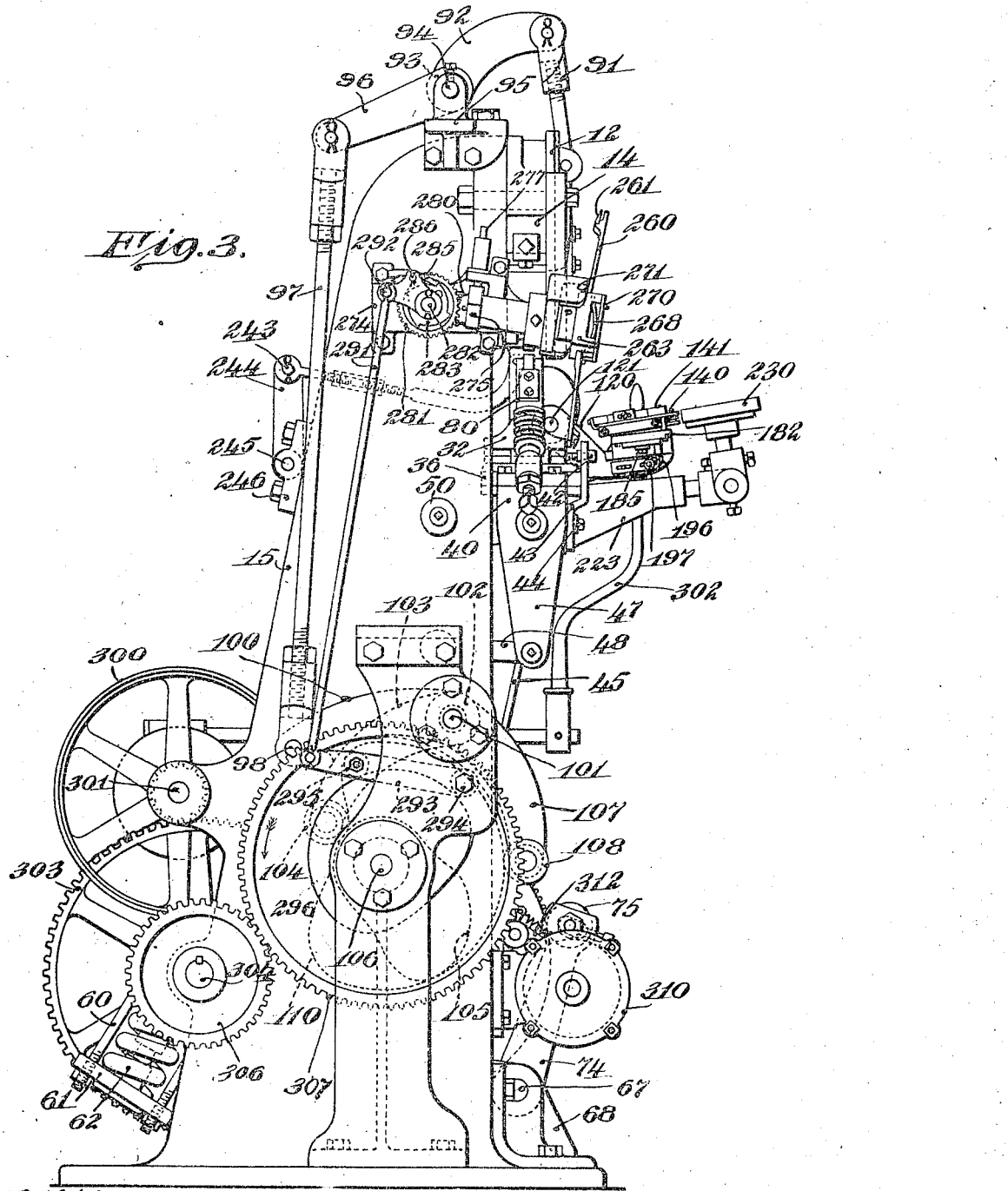
Figure 4:
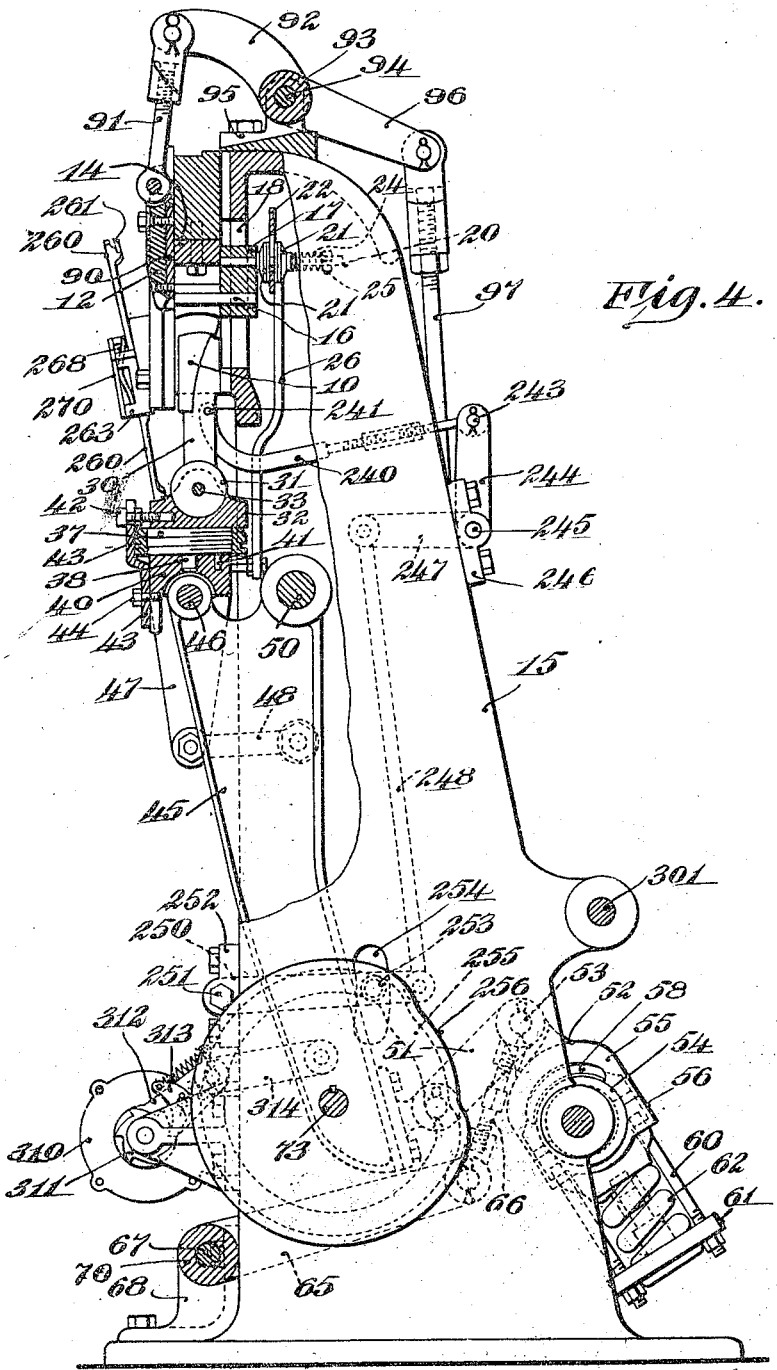
Figure 7:
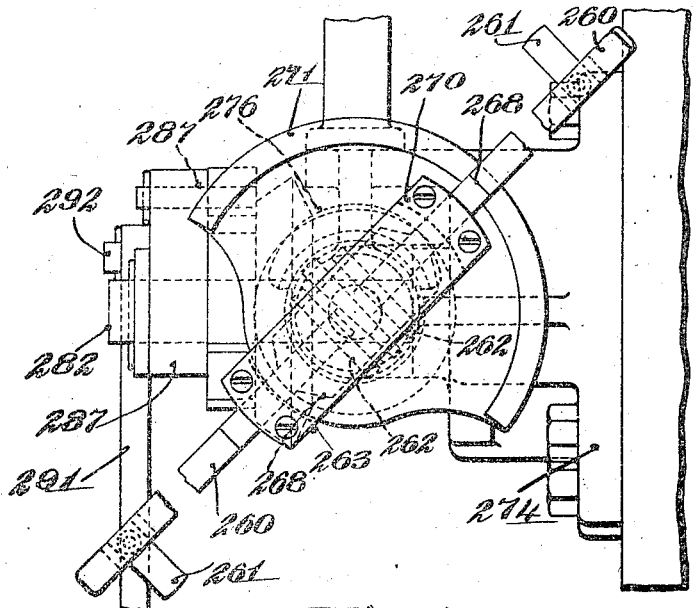
Figure 8:
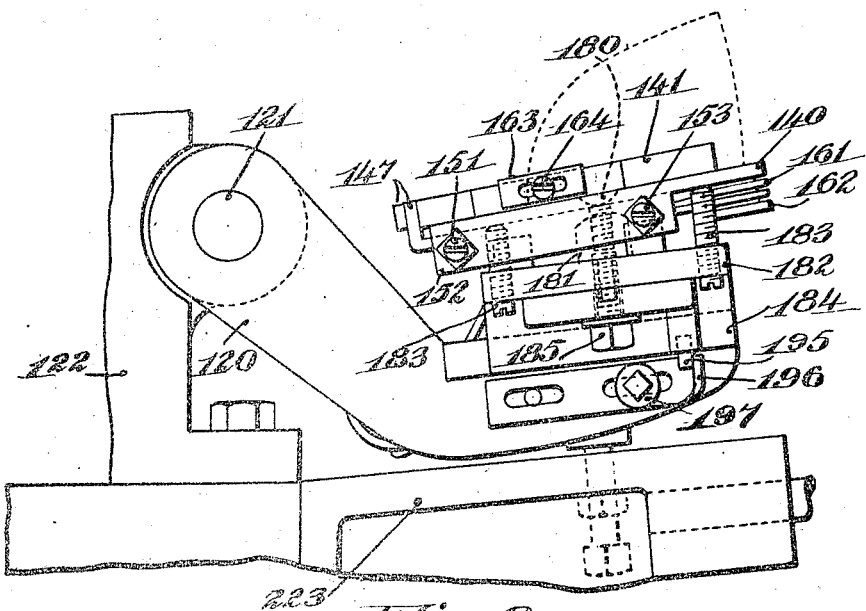
Figure 19:
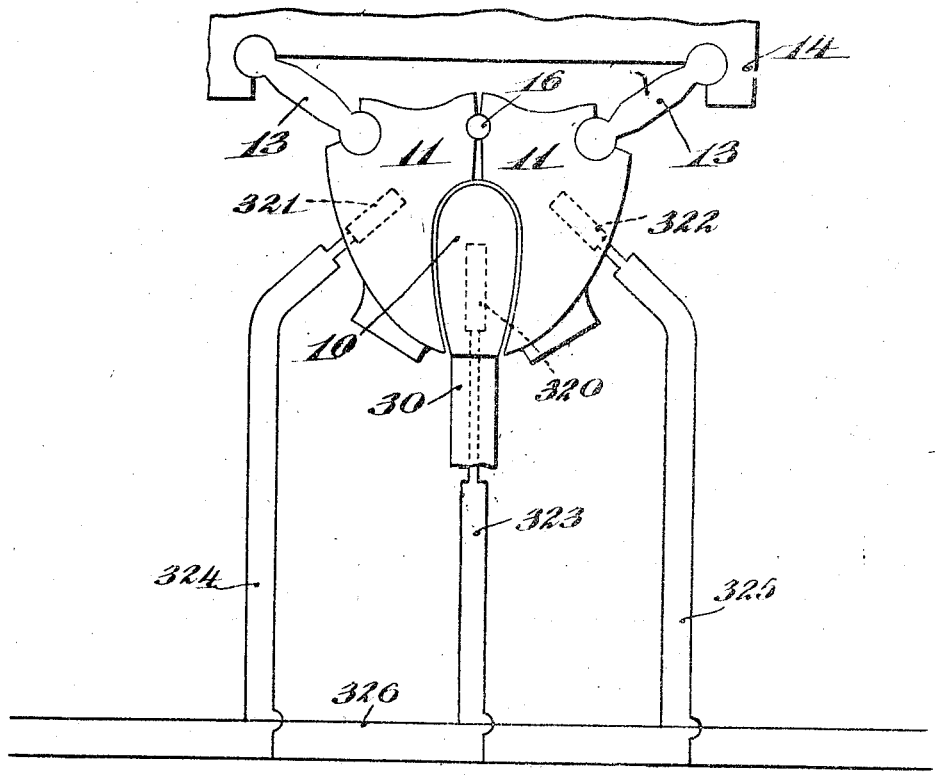

In the accompanying drawings illustrating the preferred form of the counter molding machine, Figure 1 is a front elevation of the machine; Fig. 2 is a right side elevation; Fig. 2ª is a detail illustrating the toggle opening and closing cams; Fig. 3 is a left side elevation; Fig. 4 is a sectional elevation; Figs. 5, 6 and 7 illustrate details of construction of the doffer; Figs. 8, 9, 10, 11, 11ª, 11ᵇ, 11ᶜ and 11ᵈ illustrate details of construction of the feeder; Fig. 12 illustrates five positions which the feeder and associated parts occupy during the operation of the machine; Figs. 13 and 14 are respectively a side and front elevation of the male or center mold and its carrier; Fig. 15 is a front view of the center mold when it is swung outward showing the position of the doffer with relation to it in front elevation; Figs. 16, 17 and 18 illustrate details of construction of the counter compressing eccentric and associated parts; and Fig. 19 illustrates the molds and the means for heating them.

The illustrated embodiment of the counter molding machine is described as follows: Preliminary to a detailed description of the machine and its parts, for the purpose of presenting a brief outline description of the machine which will conduce to a clearer understanding of it when described in connection with its detailed description, it may be pointed out that it consists of molds for shaping the counter which comprise two side molds and a center mold, and means for operating the molds so as to cause the center mold to enter the space between the side molds when they occupy their open position and to cause their closure upon the center mold and the exertion of a considerable pressure upon the counter carried by the center mold to cause it to be shaped to the mold. During this operation a projecting flange of the counter is bent over and pressed against the front surface of the center mold by a wiper which passes over the surfaces of the three molds while they hold the counter tightly compressed between them. The center mold is actuated by operating means to move from a position of clearance to a position of operation and then to be moved into engagement with the two side molds to cause them to compress the counter. The wiper is provided with suitable actuating means to cause it to form the flange in the lower edge of the counter. The molds are provided with heating means for heating them so that the operation is performed with hot molds in accordance with the disclosure hereinafter set forth. The machine is also provided with a feeder and feeder operating means to which the operative presents the counters and which, in turn, feeds the counters one at a time to the molds. After the molding operation is completed and the molds are separated, the center mold is swung to outward position, and the doffer, operated by suitable means, removes the molded counter from the center mold and discharges it from the machine. The machine, therefore, is one in which the operative is not required to present the counter to the molds himself. This is of importance, as it eliminates all danger of injury to the operative by catching his fingers in the molds. The operation after the counter is presented to the feeder is entirely automatic and is conducted without the intervention of the operative.

The counters to be molded are made of leatherboard, leather or paper, and are flat blanks having skived edges of the usual form. Counters of these materials, when subjected to the molding operation under the action of the hot dies, are so changed in composition by the pressure and heat that they not only retain their shape after the molding operation but are more or less waterproofed by it. This is a feature of the machine for molding the counters which is of considerable importance, as it is desirable that the counter, after it is made up into a shoe, should retain its shape even after it has been wet.

Proceeding now to a specific description of the machine, which has the usual frame, beginning with the molds themselves, the center mold 10 with the two side molds 11 and the wiper 12 to mold the counter. The side molds 11 are supported on the links 13 which take into these molds at their lower ends and take into corresponding recesses in the side molds carrier 14 which is secured to the top of the frame 15 of the machine. The side molds 11 have a recess which receives the pin 16 which, when it is raised and lowered, opens and closes the side molds. This pin may be called the side molds closing pin and is carried in turn by the block 17 which is received in a guideway 18 in the front part of the top of the frame 15 of the machine. This block receives also the pin 20 by which it is raised and lowered. The pin carries friction disks 21 which embrace the opposite sides of the slotted plate 22 by which the pin is raised and lowered. The spring pressure by which the friction plates 21 engage the plate 22 is exerted by a spring 24 on the pin 20 which is adjusted by means of the nut 25. The plate 22 is carried by the vertical links 26 which are secured to the two sides of the pate on opposite sides of the pin 20 and are connected at their lower ends to the center mold carrier.

The above-described arrangement is such that when the center mold carrier rises, it moves the links 26 upward, thereby causing the block 17 to be lifted and in turn lifting the mold closing pin 16 so as to close the side molds 11 upon the center mold. This closing movement of the molds upon the center mold is for the purpose of bringing them to a position of pressure, not for the purpose of exerting molding pressure upon the counter. The side molds are required to open and close by the swinging movements to allow the entrance and withdrawal of the center mold into the space between the side molds, the center mold being smaller near its lower end than it is at its upper end.

The center mold 10 is provided with a shank 30 having a cylindrical, condyle-like enlargement 31 on its lower end which is received in a correspondingly shaped recess in the center mold base 32. The enlargement 31 is adapted to turn in the recess in the base 32 and it is held from accidental movement therefrom by the pin 33. Owing to the severe pressures to which the parts are subjected, it is imperative that the surfaces of contact for supporting the center mold should be large, and such large surfaces are secured in this manner. The center mold base 32 is slotted at 34 on its two opposite sides, and in the slots are received the lips of the clamps 35 by which the center mold is clamped down on the upper surface of the adjusting collar 36. This adjusting collar 36 is threaded on a short screw block 37 having a central pin 38 received in a hole in the center mold carrier 40 and held from rotation on the said carrier by the pin 41. When it is desired to adjust the center mold base 32 vertically, the collar 36 is turned by means of a pin which is thrust into the holes in its periphery. The center mold base 32 is adjusted front and rear by means of the adjusting screw 42 held by the screw holder 43 secured by the bolt 44 to the center mold carrier 40. The center mold carrier 40 is pivotally mounted upon the center mold carrier lever 45 at 46. Upon each side of the center mold carrier there is a depending arm 47, the lower ends of which are connected by the links 48 with the frame of the machine, as shown in Figs. 1 and 4. The center mold carrier lever 45 is pivotally supported upon the frame of the machine at 50 to rock toward and from the side molds, and at its lower end is connected by means of a toggle with the counter compressing eccentric. The toggle consists of the link 51 pivotally connected to the lower end of the lever 45 and the link 52 pivotally connected at 53 to the link 51 and mounted upon the counter compressing eccentric 54. The link 52 consists of two members, the upper member 55 and the lower member 56 bolted together by the bolts 57. These two link members 55 and 56 embrace the eccentric journal 58 which is directly mounted on the eccentric 54. The journal 58 is connected by the bolts 60 with the spring follower 61 against which the spring 62 takes, the other end of the spring taking against the member 56. The spring follower 61 is provided with a pin 63 which is received in a recess 64 in the member 56. The toggle is straightened by means of a toggle-straightening lever 65 to the end of which a link 66 is secured which is attached to the knuckle pin 53 of the toggle. After the toggle is straightened, the counter molding pressure is exerted on the center mold carrier lever 45 by the counter compressing eccentric 54.

The spring 62 is for the purpose of permitting a yielding of the parts in case of an extraordinarily thick counter or the accidental insertion of two counters in the machine at one time, and by reference to Figs. 16, 17 and 18 it will be seen that in this case the eccentric moves the journal 58 in the direction to cause compressing pressure to be exerted upon the center mold carrier lever 45, but in case that lever is held from movement by extra thickness of material in the molds and cannot move, then the journal 58 is permitted to move in compressing direction by the yielding of the spring 62. This is of importance, as it is a simple method of preventing the exertion of extraordinary stress on the machine parts or the breaking of parts of the machine. The link 66, which connects the toggle knuckle to the toggle-straightening lever 65, is made adjustable, for obvious reasons. The toggle-straightening lever 65 is mounted on the shaft or pin 67 supported in brackets 68 secured to the frame of the machine. The hub 70 of the lever 65 is provided with two cam arms. One of these cam arms, the arm 71, carries a cam roll at its end which engages the cam disk 72 mounted on the cam shaft 73 supported in suitable bearings on the frame of the machine. This cam arm may be called the closing cam as its swells move the straightened lever 65 in the direction to close the toggle. The other cam arm, the arm 74, formed on the hub 70 of the straightener lever 65, is provided on its end with the cam roll 75 which engages the cam disk 76 also mounted on the shaft 73. This cam disk is for convenience called the toggle opening cam, as its swells move the lever 74 in the direction to cause the opening or breaking of the toggle.

The above-described arrangement is such that in timed coöperation with the other parts of the machine, the toggle is straightened and the eccentric turns in the direction to cause the counter molding pressure to be exerted upon the counter supported between the molds.

Incidentally, it is to be pointed out that the center mold carrier is provided with two spring-pressed, side mold engaging, thrust slides 80 provided with rolls upon their ends which engage the surfaces on the side molds and which contribute to cause the molding pressure to be exerted upon the side molds when the center mold is raised.

The wiper 12 carries a wiper blade 90 which is secured to the wiper by screws. To the wiper is connected the link 91 which is pivotally connected to the arm 92 provided with a hub 93 mounted on the shaft 94 supported in brackets 95 secured on the top of the frame of the machine. The hub 93 is also provided with the arm 96, to the rear end of which is pivotally connected the link 97 which, at its lower end, is pivotally connected at 98 to the arm 100 pivotally mounted at 101 on a stationary part of the machine. The hub 102 of the arm 100 also carries two cam arms, one of them the cam arm 103 which carries at its end the cam roll 104 which engages the cam disk 105 mounted on the cam shaft 106 supported in bearings in the frame of the machine; the other cam arm, 107, mounted on the hub 102, carries at its end the cam roll 108 which engages the cam disk 110 mounted on the same cam shaft 106.

The above-described arrangement, the contour of the cams, and the timing of the parts, are such that after the molds are closed upon the counter, the wiper is actuated to move downwardly over the front faces of the molds and thereby flange the edge of the counter over the front surface of the center mold, after which it is again lifted and the molds are opened.

The feeder consists of a device into which the counter is introduced by the operative, which holds the counter and carries it to position between the compressing molds. In general, the feeder consists of a plate having counter-holding devices in it, which is carried by an arm pivotally supported in position to swing so as to move from a position of clearance to a position of presentation of the counter to the molds. Specifically considered, the feeder is mounted upon an arm 120 which is secured to the rock shaft 121 pivotally mounted in the bracket 122 on the center mold carrier 40. Also mounted on the shaft 121 is the arm 123 to the end of which is secured one end of the link indicated in a general way by the reference character 124, the other end of which is secured to the upper end of the feeder operating arm 125. The arm 125 is mounted on the hub 126 supported on the shaft 127 carried by the brackets 128. Upon the hub 126 is also secured the feeder cam arm 130 which carries upon its lower end the cam roll 131 which takes against the cam formed by the cam part 132 secured on one side of the gear 133 by means of the cap bolt 134 which passes through a slot in the cam part 132 so as to afford provision for varying the timing of the operation of the feeder. The other cam part 135 is similarly secured in an adjustable manner to the said gear 133, and, together, they form a partially closed cam path for controlling the movements of the cam arm 130. The gear 133 rotates in the direction of the arrow 136 and it will be observed that the shapes of the cam parts are such that the feeder is lifted and then held in a stationary position for a spell while the molds are closing upon the counter, and that thereafter the downward movement of the feeder is begun by the engagement of the cam part 135 with the cam roll 131, after which the feeder is released from the control of the cam.

The feeder plate 140 supports the devices for holding the counter, and is supported itself by the other connections with the arm 120. This feeder plate 140 supports the two outside counter grips 141 and the two inside counter grips 142 pivoted together on the screws 143. Each of the inside grips 142 is provided with two out-turned ears 144 which are received in top and bottom recesses 145 and 146 in the rear end of the outside grips 141. The screw 143 forms a pivot by which the grips are hinged together. On the rear end of the outside grips 141 are secured the angle pieces 147, which extend downward from the outside grips 141 and forwardly under the plate 140. Upon the forward ends of these angle pieces 147 are formed the spring seats 148 and between these two spring seats the spring 150 is placed which exerts an outward pressure tending to hold the parts apart and against the stop screws 151 adjustably mounted in the downwardly extended webs 152 of the plate 140. In order to adjust the position of the grips at their rear ends so that they shall hold the counter in correct position to enter the space between the molds, the screws 151 are adjusted inward, or outward, as the case may be, the spring forcing them outward to follow the screws when they are withdrawn. Set nuts are employed to fasten the adjusting screws 151 in adjusted position. The forward ends of the counter grips are adjusted toward and from each other to correspond to the width of the heel of the counter by the adjusting screws 153 similar to the adjusting screws 151, the inner ends of which take against the blocks 154 on the underside of the plate 140. The blocks 154 are each secured to an outside grip 141 by means of the screws 155. The screws pass up through slots 156 and screw into the outside grips 141. A spring, hereinafter described, normally holds the blocks separated from each other as far as the adjusting screws 153 permit, and these adjusting screws determine, therefore, the outer position of the outside grips. Into each of the inside grips 142 are screwed the pins 157 which are secured in the grips 142 and loosely pass through slots 160 in the ends of the blocks 154 and loosely through the slots 156 so that such pins may move toward and from each other in the slots 156 and 160, thus permitting the inside grips to move toward and from each other. A spring 161 wound around the post 162 has its ends engaging the two screws 157 and normally tends to press them outwardly so as to force the inside grips outward toward the outside grips. Gages 163 adjustably secured by the screws 164 to the outside grips determine the position of the counter when it is thrust between the grips. The operative, in presenting the counters to the grip, takes up a counter, bends it into a U shape and thrusts its lower edges between the inside and outside grips, which grips then hold the counter while it is presented to the molds.

The feed plate 140 is secured by means of the screw 180 to the convex-surface post 181 which rises from the center of the feed plate support 182. This feed plate support has four adjusting screws 183 which project upwardly from it and engage the under surface of the feed plate 140. It will thus be seen that by turning all of them in the same direction the feed plate can be raised or lowered and the screw 180 will secure the feed plate in the adjusted position; also that when it is desired to change the inclination of the feed plate this can be accomplished by turning some of the screws so as to move the plate in the desired direction. The feed plate support 182 is adjustably secured to a lateral projection from the feed slide 184 by means of the cap bolt 185 which passes through a slot 186 in the bracket of the feed slide and screws into the feed plate support 182. The slot 186 provides for lateral adjustment of the feeder so that it may be adjusted to present the counter correctly laterally with relation to the mold. Projecting from the underside of the feed plate 182 are the ends of two pins 187 which engage a groove 188 in the upper side of the lateral bracket on the feed slide 184. These pins prevent the feed plate from any turning movemetn of the feed plate support on the bracket of the feed slide. The feed slide 184 is provided on its underside with a dovetail groove which receives a dovetail guide 189 and in order to secure a nice fit between the slide and guide an adjustable gib 190 is provided, screws 191 affording means for adjustment of the gib. The slide 184 is yieldingly pressed outwardly by means of the spring 192 which is wound on the spring support 193 in turn adjustably secured by the bolt 194 to the side of the arm 120. By loosening the bolt 194 and turning the spring support 193 the tension of the spring may be adjusted. The outward movement of the slide 184 is limited by the engagement of the stop pin 195, (see Fig. 8) secured in the underside of the slide 184, with the stop 196 adjustably secured by means of the cap bolt 197 to the arm 120. The spring normally holds the slide 184 against this stop at all times except when during the operation of the machine the feeder has presented the counter to the mold and until the upward movement of the feeder due to the upward movement of the center mold carrier has risen so as to cause the feed slide 184 to strike the stop 200 adjustably secured to a stationary part of the machine. (See Figs. 1 and 2.) During the latter part of the upward movement of the center mold carrier, which movement, of course, is participated in by the feeder which is carreid thereby, the counter is arrested by its engagement with the side molds, and during the nip of the molds the center mold carrier rises and unless the feed slide were arrested in its rising movement by engagement with the stop 200, the end gages 163 of the feed carrier grips would indent the front ends of the counter.

The operation of the feeder is indicated in a general way by reference to Fig. 12, in which position 1 shows the position of the feeder after the operative has doubled the counter and placed it between the counter grips; in which position 2 shows the feeder after it has placed the counter between the counter molds; and in which position 3 shows the feeder after it has been returned to its original position. In this connection it is to be observed that the feeder is also provided with a stop to prevent overthrow of the feeder in the direction of feeding movement. The rock shaft 121 is provided with an arm 210 having a set screw 211 in its end which, when the feeder is actuated to present a counter to the molds, engages the surface of the bracket 122 so as to stop the feeder in correct position with relation to the mold. (See Figs. 1 and 2.) Furthermore, it is to be noted in connection with the link 124 by means of which the motion is transmitted from the cam to the feeder (see Fig. 2), that it has provision for lengthening and shortening it consisting of the right and left screwthreaded bolt 215 secured at one end by a set nut. Furthermore, one end of this bolt is screwed into a block 216 which is received in a hole 217 in the member 218. This block 216 is supported by a spring in the bottom of the hole and normally held from movement outward by a spring latch 219. If a counter should become crumpled during the act of presenting it to the molds and thereby obstruct the feeding movement of the feeder, the spring under the block 216 would yield thereby permitting the arrest of the movement of the feeder without breaking of any parts. When the feeder falls it strikes an adjustable stop 220 (see Fig. 10) surfaced with leather 221 and supported by an adjustable screw 222, which screw is supported in the bracket 223 projecting forward from the center mold carrier.

For the convenience of the operator in presenting the counter to the feeder, a feed table 230 is provided supported in adjustable position from the bracket 223. This feed table 230 may be adjusted so as to bring its upper surface into the plane of the upper surface of the feed plate 140, so the operative may bend a counter into U-shaped form and press it down upon the feed table and then, when the feeder falls into open position, all the operative is required to do is to slide the counter forward, entering its edges between the counter grips 141 and 142. This contributes to the ease of feeding the machine.

In doffing the counter the center mold is tipped outward from between the two side molds, so that the counter may be lifted off. In describing the center mold, reference was made to the pivotal support thereof upon its base. The means for tipping the center mold consists of the link 240 which is pivotally connected at its forward end at 241 to the center mold, its end being received in a recess 242 in the back of the center mold. The rear end of the link 240 is pivotally attached at 243 to one arm 244 of a bell crank lever pivoted on the shaft 245 supported in bearings 246 secured to the frame of the machine. The other arm 247 of the bell crank lever is connected by means of the link 248 to the cam lever 250 pivoted at 251 to a bearing 252 secured to the frame of the machine. This cam lever 250 carries the cam roll 253 on the end of a stud secured to the lever, which projects through the slot 254 in the frame of the machine and enters a cam groove 255 in the cam 256 secured to the cam shaft 73.

The above described arrangement and the shape of the cam path are such that after the compressing operation the center mold is tipped forward to the position shown in position 5, Fig. 12, so that the doffer can have access to the counter to lift it off of the center mold, and thereupon the center mold is returned to its original position. By reference to Fig. 4, it will be observed that after the mold is tipped outward, it is held stationary in outward position a short time while the doffing operation is performed. The doffer properly consists of a device provided with a finger which slides under the flange at the rear of the heel of the counter and lifts the counter off of the center mold. The doffer is a double affair, having two of these devices for engaging counters, which operate one after the other for the purpose of doffing the counters from the center mold. Each of the two doffer arms 260 carries at its end a doffer finger 261 which is a flat piece of metal secured to the side of the doffer arm 260. The advancing edge of the finger 261 is beveled so that it may slide under the downturned flange of the counter between the flange and the front surface of the center mold. Then it rises and engages the inside of the rear of the counter near the flange thereof, and by its continued movement it lifts the counter off of the center mold. The doffer arms 260 are each pivoted at their inner ends upon pins 262 to the doffer carrier 263, which carrier is provided with a hub 264 secured by a drive pin 265 to the doffer shaft 266. The doffer carrier 263 is a slotted piece, and the arms 260 lie in the slots 267 thereof. A spring 268 presses the doffer arms toward the bottom of the slot, and in Fig. 6 the lower doffer arm 260 is shown at the bottom of the slot and the upper doffer arm is shown in lifted position.

A cover plate 270 covers the open end of the doffer carrier and closes the slots 267. This cover plate is secured in place by screws, as seen in Fig. 7. The spring 268 has narrow ends which are received in the slots 267 and rest on the outer surfaces of the doffer arms 260, and between its ends this spring is wider so that it is held in place by the cover plate 270 and the slots 267 of the carrier. The doffer arms 260 during a portion of their rotation engage upon their rear sides the cam 271, the shape of which is shown in plan in Fig. 5 and in elevation in Fig. 6. The shape of this cam is such that as the doffer turns around with the shaft 266 it swings outward to correspond to the position of the front face of the center mold. The cam 271 is provided with a hub 272 which fits on a portion 273 of the bracket 274. The doffer shaft 266 is supported in a bearing in the bracket 274 and bears upon its inner end a friction disk 275 which is engaged by a friction pad 276 mounted upon the lower end of a pin 277 forced downwardly by a spring to hold the pad in frictional engagement with the friction disk 275. Upon the inner end of the doffer shaft 266 is secured a bevel gear 280 which meshes with a second bevel gear 281 mounted on the shaft 282 supported in the bracket 274. Alongside of the gear 281 is mounted the ratchet wheel 283 which is secured to said gear 281 by means of the screws 284. The ratchet wheel 283 is actuated by a pawl 285 pivoted at 286 on the pawl carrier 287 which is provided with two bearings 288 and 290 which embrace the shaft 282. This pawl is normally pressed in the direction to cause its tooth to engage the teeth of the ratchet wheel by means of a spring. The pawl carrier 287 is actuated by means of a link 291 pivotally attached at its upper end to the pawl carrier at 292. The link 291 is pivotally attached at its lower end to the rear end of the cam lever 293 which in turn is pivotally mounted at 294 upon a stationary part of the machine. The cam lever 293 carries a cam roll 295 which engages the surface of the cam disk 296 secured to the cam shaft 106.

The above-described arrangement is such that at each operation of the machine the doffer is rotated through one-half revolution. Starting with the doffer in the position shown in Fig. 1, the lower doffer arm 260 swings around from the position shown in that figure to the position occupied by the upper doffer arm in that figure, and as the machine continues its operation the doffer swings farther and throws the doffed counter off on the left of the machine.

In concluding the description of the operation of the machine, the power connection for the cam shafts and eccentric shaft will be described. The belt pulley 300 is loosely mounted on the shaft 301 and adapted to be clutched thereto by means of a clutch operated by the hand lever 302. When the belt pulley 300 is clutched to the shaft 301, the latter shaft is revolved and a pinion carried by it engages the gear 303 mounted on the eccentric shaft 304 which carries the eccentric 54. Also mounted on the eccentric shaft 304 is the gear 305 which meshes with the gear 133 secured to the cam shaft 73. The sizes of these gears are such that the cam shaft 73 is rotated once for each two revolutions of the eccentric shaft 304, but when the toggle is broken the actuation of the eccentric is incapable of effecting any substantial movement of the center mold carrier and so while two attempts are made at each revolution of the eccentric shaft to actuate the center mold, on only one of them is the toggle straightened. Another gear 306 mounted on the eccentric shaft 304 engages the gear 307. This gear is therefore rotated at the same speed as the other cam gear.

The opening movement of the toggle is accompanied by a sort of pound at the extreme end of the movement, and in order to avoid this a friction drag or shock absorbing device is connected to the center mold carrier lever. A friction device carried by the holder 310 is attached to the ratchet 311 and an arm 312 loosely pivoted on the shaft carries a pawl 313 which engages the teeth of this ratchet 311. The pawl is spring-pressed, as shown. The free end of the pawl arm 312 is connected by means of the link 314 with the center mold carrier lever 45. Upon the straightening or closing movement of the toggle, the pawl goes back freely, but when the center mold carrier lever 45 swings toward the position illustrated in Fig. 4, the friction drag arrests the too free movement of this lever and prevents the pound which otherwise is observed.

The devices for heating the molds consist of electrical heating units 320, 321 and 322 received in holes in the center and side molds respectively and operated by leads 323, 324 and 325 respectively from the current source 326. (See Fig. 19.) One effect of the use of heat is that it conduces to the ready doffing of the counters which otherwise sometimes adhere tenaciously to the center mold. The exact reason for this is not definitely known, but it is believed that the constitution of the whole or superficial portions of the counter is changed in such a way as to prevent the objectionable adhesion of the counter to the molds. Another effect is the improvement in the water-resisting character of the counter. This is especially important in connection with fiber counters, as it produces a counter which retains its shape after being incorporated in a shoe in spite of the moisture due to perspiration or exposure to water. It seems, and the fact is believed to be, that the heat effects a sort of chemical change in the whole or superficial portions of the counter by virtue of which it is rendered more or less water-resisting. In molding counters with cold molds, as has heretofore been the practice, the shape of the molds is required to be exaggerated because when the counter is removed from the molds it springs away from the form which it was caused to assume under pressure, whereas, in molding with hot molds, according to the present invention, the counter when removed from the molds springs back very much less, so that counters of uniform shape are produced. The counters molded by the use of cold molds spring back when removed from the molds to different degrees, depending somewhat upon the condition of the counter when it was inserted in the mold, so that the product is non-uniform in character, whereas, in molding counters according to the present invention, the counters respond very closely to the form of the molds and spring back a substantially uniform amount, as a result of which it is possible to obtain counters which very closely approximate the shape of the last upon which the shoe is to be made in which the counters are used. The counter blanks are preferably superficially coated or saturated with paraffin, but the water-resisting character of the product is observed without the use of this material, altho its use enhances that quality. The it should be heated preferably to a temperature of about 250° F.

The machine of the present invention, viewed in its broader aspects, is not limited to the details of construction described.

Having described the invention, what is claimed is:—

1. A counter molding machine having in combination a fixed frame, a pair of pivotally mounted side molds therein together with actuating mechanism therefor, a center mold mounted on said frame adapted to rock back and forth with respect to said pair of side molds, and a doffer constructed and arranged to engage the flange of the molded counter when the center mold is rocked out of and away from the plane of said side molds and to move in a direction to disengage the counter from the center mold, said doffer and molds having a relatively fixed relation to each other with respect to the frame.

2. In a counter molding machine, in combination, a fixed frame, a pair of pivotally mounted side molds movable toward and from each other in a substantially vertical molding plane, a center mold mounted on said frame adapted to rock into and out of the plane of the side molds, means for actuating said mold to bring it into the molding plane, means for moving the molds relatively together toward and from each other when in said molding plane, said center mold being provided with a condyle-like bearing, and a socket base in which said bearing is seated.

3. A counter molding machine having, in combination, center and side molds adapted to rock toward and from each other and a counter doffer, said doffer being mounted and arranged to move about an axis perpendicular to the plane of the molds and also in a plane approximately parallel to the plane of the molds.

4. In a counter molding machine, in combination, movable side molds, a center mold movable into and out of the plane of the side molds, and a feeder for feeding counter blanks to the molds while they are in the same plane.

5. A counter molding machine having, in combination pivotally mounted side molds adapted to swing toward and from each other, a rocking center mold movable at right angles to the plane of the swinging movement of the side molds and a revolving doffer mounted at one side of the center mold and revolving in a plane approximately parallel to the plane of the swinging movement of the side molds adapted to lift the counter from the rocking center mold when said center mold is swung away from said side molds.

6. A counter molding machine having, in combination, side molds, a center mold adapted to rock toward and from said side molds and a feeder mounted to swing about a fixed axis approximately coincident with that of the rocking center mold to carry the counters into position to be molded.

7. A counter molding machine having, in combination, molds, and a counter feeder having resilient supporting means and actuating connections so constructed and arranged that the feeding movement is adapted to be arrested by the yielding of a part thereof.

8. A counter molding machine having, in combination, coacting molds including a center rocking mold and operating means for said rocking mold including a toggle, and an eccentric having a yielding connection with said toggle.

9. A counter molding machine having, in combination, coöperating molds adapted to move toward and from each other, operating means for one of the molds including a toggle and a shock absorber connected with the toggle adapted to prevent pounding as the toggle moves to collapsed or broken position.

10. A counter molding machine having, in combination, a pair of oppositely swinging side molds, a center mold adapted to rock toward and from the plane of the movement of the side molds, and means for adjusting said center mold in the direction of its length.

11. A counter molding machine having, in combination, side molds, a center mold, a lever for operating it, a toggle for swinging the lever, cam mechanism for opening and closing the toggle and an eccentric for exerting counter molding pressure on the lever.

12. A counter molding machine having, in combination, movable side molds, a movable center mold for exerting pressure upon a counter positioned between said molds, and a relatively movable feeder supported on said center mold for feeding the blanks into operative position between said molds.

13. A counter molding machine having, in combination, molds, a feeder having counter holding means, means for universal adjustment of the feeder to cause it to feed the counter correctly to the molds and means for locking the adjusting means in desired position.

14. A counter molding machine having, in combination, molds, a feeder having heel and instep portions, counter holders mounted on said feeder and separate means for adjusting the width of the heel and instep portions of the holder.

15. In an automatic self-contained counter molding machine, in combination, a pair of movable side molds, a center mold movable toward and from the side molds, means within each of said molds for heating the same uniformly and flexible connections for supplying heating medium thereto to permit free movement of said molds in their molding movements, and a doffer adapted to co-act with the molds for removing the molded counter.

16. A counter molding machine having, in combination, movable side molds, a center mold movable into and out of the plane of the side molds, a feeder for feeding counter blanks to the molds while they are in the same plane, and a doffer for removing the molded counter while the center mold is out of the plane of the side molds.

17. In an automatic self-contained counter molding machine, in combination, a pair of movable side molds, a center mold co-acting therewith movable toward and from the side molds, electrical heating means within each of said molds connected with a suitable source of supply, feeding means adapted to feed counter blanks to the hot molds, and means for removing the counters from the hot molds.

ROSWELL A. LANCEY.

Witnesses:
HORACE VAN EVEREN,
GEO. E. STEBBINS.